United States Patent [19]

Marich et al.

[11] Patent Number: 4,657,449
[45] Date of Patent: Apr. 14, 1987

[54] INTERNAL SEWAGE LINE STUB CUTTING TOOL HAVING AUTOMATIC BIT ADJUSTMENT

[75] Inventors: John J. Marich, Lemont; Thomas V. Vartanian, LaGrange Park, both of Ill.

[73] Assignee: J. Marich & Sons, Lemont, Ill.

[21] Appl. No.: 862,115

[22] Filed: May 12, 1986

[51] Int. Cl.$^4$ ............................ B23C 3/02; E03F 3/06
[52] U.S. Cl. ................................. 409/143; 15/104.09; 51/245; 166/55
[58] Field of Search .................. 409/143, 307; 29/337; 166/55; 51/245; 15/104.03, 104.05, 104.09, 104.16

[56] References Cited

U.S. PATENT DOCUMENTS

| | | | |
|---|---|---|---|
| 3,326,086 | 6/1967 | Whitehill | 409/143 X |
| 4,084,484 | 4/1978 | Shklyanov et al. | 409/143 X |
| 4,197,908 | 4/1980 | Davis et al. | 166/55 |
| 4,327,526 | 5/1982 | Pettyjohn et al. | 51/245 |
| 4,383,395 | 5/1983 | Wilger et al. | 51/245 |
| 4,442,891 | 4/1984 | Wood | 409/143 X |
| 4,577,388 | 3/1986 | Wood | 407/143 X |

FOREIGN PATENT DOCUMENTS

| | | | |
|---|---|---|---|
| 85819 | 5/1985 | Japan | 51/245 |
| 2085780 | 5/1982 | United Kingdom | 409/307 |
| 698726 | 12/1979 | U.S.S.R. | 409/143 |
| 837607 | 6/1981 | U.S.S.R. | 409/143 |
| 854610 | 8/1981 | U.S.S.R. | 409/143 |

Primary Examiner—William R. Briggs
Attorney, Agent, or Firm—McDougall, Hersh & Scott

[57] ABSTRACT

A remote cutting tool for insertion into an underground sewage pipe for trimming branch line stub ends that extend into the sewage pipe. The cutting tool comprises a sled adapted to be drawn through the interior of the pipe by cables attached thereto. A cylindrical cutting bit is driven by a hydraulic motor, the motor and bit being retained on the sled through a hydraulic jack ram. The jack ram facilitates the axial movement of the motor and bit with respect to the sled as required to effect branch stub cutting. Expandable pneumatic sleeves are provided on the sled which, when inflated, lock the sled in fixed orientation in the pipe prior to each cutting operation. A guide member is positioned over the pneumatic sleeve adjacent the point of intended cutting to deflect the sleeve in the opposed direction and to align the cutting bit in close proximity to the sewer pipe wall at the point of stub pipe entry.

7 Claims, 6 Drawing Figures

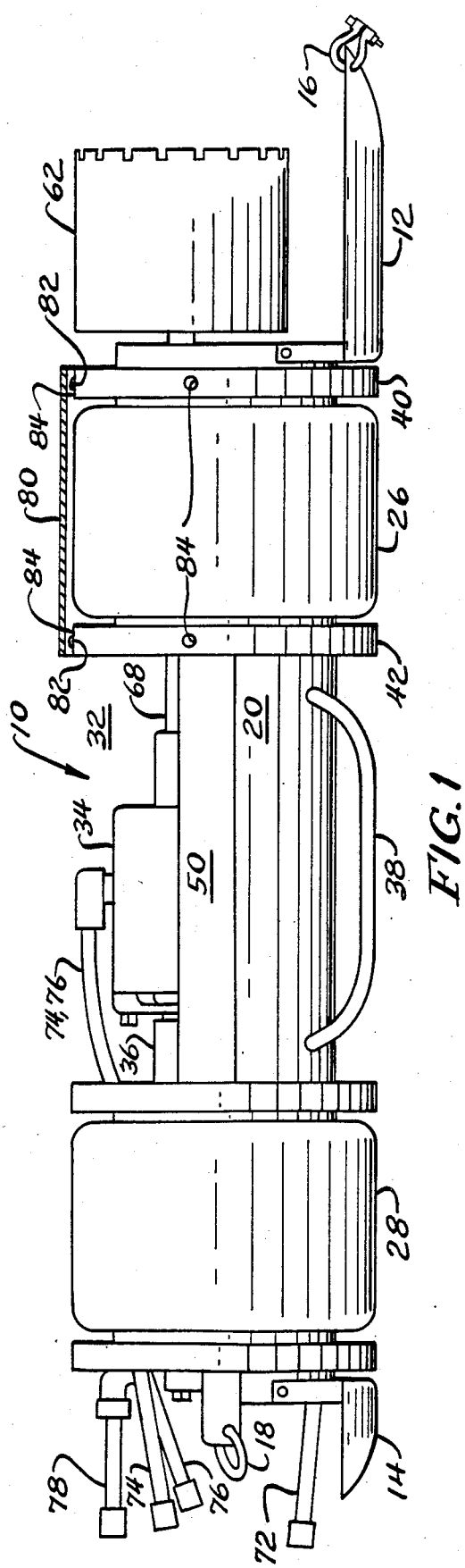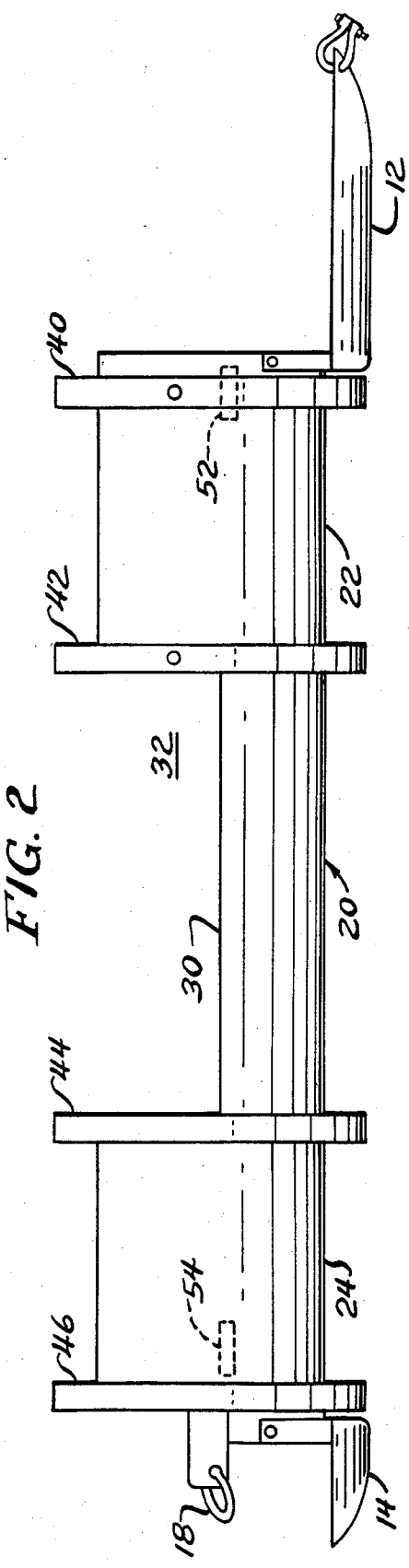

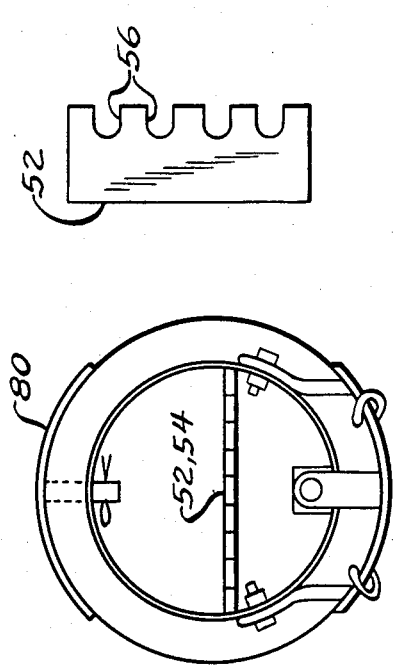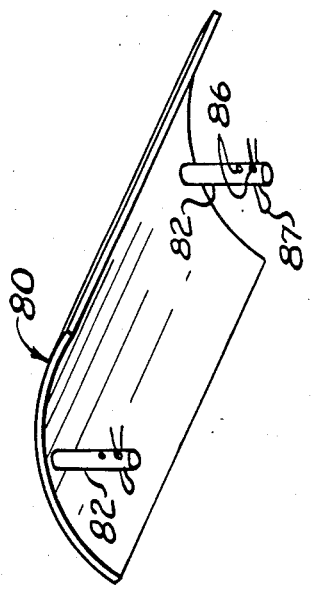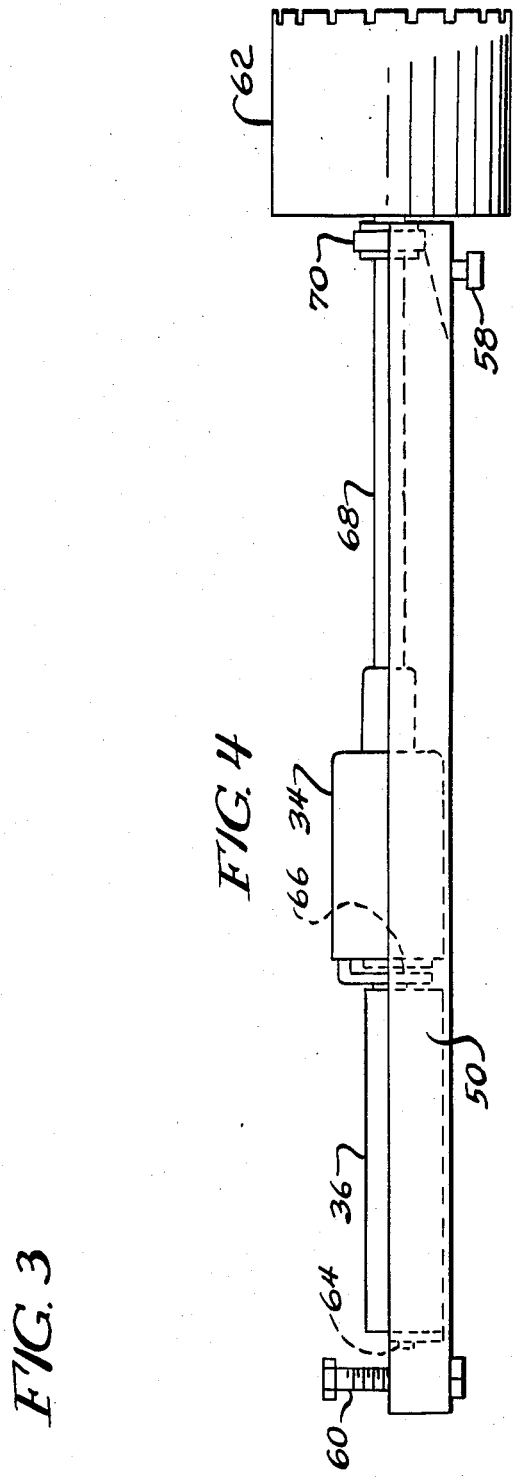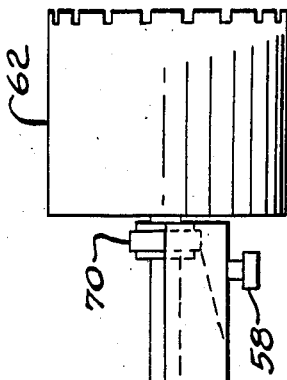

INTERNAL SEWAGE LINE STUB CUTTING TOOL HAVING AUTOMATIC BIT ADJUSTMENT

The present invention pertains generally to the field of in-ground sewer line repair and, more particularly, to the removal of branch line stubs protruding into the main sewer line prior to the repair of that line.

It is well known that underground sewage lines develop cracks at the junctions of adjacent pipe segments as well as along the lengths of pipes themselves. These cracks permit substantial fluid leakage in the form of raw sewage escaping from the system into the surrounding environment and, conversely, environmental subsurface water entering the sewage sysem. Neither leakage is desirable as the loss of untreated sewage presents a potentially hazardous pollution problem while water entering the system places substantially greater loads on the sewage treatment equipment. As a consequence, these old sewer lines must be either repaired or replaced. Repair has increasingly become the only realistic solution as complete replacement is very expensive and often impractical in view of the attendant requirement that the old pipes be dug up.

Techniques for in-ground repair have been developed and generally involve the relining of the inside of the pipe. These techniques are described in numerous U.S. patents including, for example, U.S. Nos. 4,009,063; 4,064,211; 4,366,012; 4,401,696; and 4,439,469. However, before the resin liners taught by these references can be inserted into the pipe, inflated and cured, it is necessary to remove any obstructions in the pipe such as roots and, with particular regard to the present invention, stub ends of intersecting branch pipe lines.

The present invention is specifically directed to cutting apparatus for removing the excess end portions of branch pipes which penetrate into the interior of the main sewer line. Such cutting results in a substantially flush, cylindrical inside wall contour into which the resin lining may thereafter be inserted.

Apparatus adapted for cutting while inserted in a pipe are well known including U.S. Pat. No. 1,358,818; to Bering, to Page, U.S. Pat. No. 2,280,769; and to Brown, U.S. Pat. No. 3,587,194. The Bering and Page references describe cutters for transversely severing the very casing in which the cutter is positioned and, therefore, have only a limited relevance to the present invention. The cutting apparatus depicted in the Brown patent is, on the other hand, generally directed to the cutting of stub pipe ends. In contrast to the present invention, Brown does not incorporate means for automatically spacing or aligning the cutting bit in close proximity to the interior wall of the sewer pipe undergoing repair and, consequently, Brown must utilize an annular cutting bit having a cross-sectional diameter only slightly less than that of the pipe into which it is positioned in order that protroding stub pipes can be trimmed substantially flush with the interior pipe surface. The precise orientation of Brown's cutting bit will vary according to pipe surface irregularities and the pressure of inflation of the expandable sleeves used to generally center the bit and to maintain the cutting sled in fixed position in the pipe during cutting operations.

The use of a cutting bit of substantially the same diameter as that of the pipe into which it is to be operated, however, has proven unsatisfactory in that the bit can 'hang-up' on pipe irregularities which are inevitably found in underground sewage systems, particularly adjacent pipe joints. Such problems are exacerbated over years of sewage line service due to the accumulation of minerals and other deposits or the deformation of the pipe, itself. Further, as noted above, in the absence of a means for aligning the cutting bit, accurate 'flush' cutting of stub pipes cannot be assured, even where relatively larger diameter cutting bits are utilized.

The present invention, by contrast, permits the use of a cutting bit of lesser diameter than that of the pipe into which it is intended to operate. In this manner, the cutter sled with its associated hydraulic motor and cutting bit is relatively free to travel through the damaged sewer pipe undergoing repair. It will be appreciated, however, that regardless of the bit diameter employed, in the absence of a means for aligning the bit adjacent the sewer pipe interior surface, unsatisfactory results may occur for the reason that there is no mechanism to assure that protruding branch stubs will be severed substantially flush with the interior surface of the main sewer pipe.

The present stub cutting apparatus utilizes one or more guide plates mounted adjacent the expandable sleeves thereby causing the sleeve to deform away from the guide plate upon inflation thereof. The guide plates, in short, serve to preclude expansion of the sleeve in the direction radially outwardly of the guide plate while simultaneously forcing the sleeve to expand outwardly from the opposed side of the sled. In this manner, the expanding sleeve applies an asymmetrical force against the pipe walls thereby urging the the guide plate into tight abutting contact with the wall.

The guide plates of the present invention serve, first, as a means for redirecting the otherwise donut-shaped, omni-directionally expanding sleeve in a predetermined direction to facilitate the requisite biasing of the hydraulic motor and cutter bit against the pipe wall and, second, as an indexing member to assure that the cutter bit will be accurately positioned in a predetermined closely spaced relationship to the pipe wall at the point of stub pipe cutting.

It is therefore an object of the present invention to provide a cutter apparatus adapted for severing stub pipe ends that protrude into the interior of subsurface sewage lines. It is a further object that the cutting bit of the apparatus may be selectively transversely positioned within the sewer pipe in close proximity to the pipe sidewall at a point immediately adjacent a protruding stub pipe. A further object of the invention is the use of the pneumatic sleeves to provide the transverse biasing force required and, further, that such force shall be automatically applied upon sleeve inflation. A further object of the present invention is the accurate positioning of the cutting blade in predetermined close spacing of the pipe interior wall whereby stub pipes may be severed in substantially flush with such interior wall.

FIG. 1 is a left side elevation view of stub cutting apparatus embodying the present invention;

FIG. 2 is a left side elevation view of the housing, skids, and sleeve retaining rings of the cutter apparatus of FIG. 1;

FIG. 3 is a front elevation view of the housing, skids, and sleeve retaining rings of FIG. 2;

FIG. 4 is left side elevation view of the channel or intermediate member illustrated with the hydraulic ram, motor, bearings, and cutting bit thereon;

FIG. 5 is a top plan view of the front channel support shelf illustrating the multiple channel indexing slots; and, FIG. 6 is a perspective view of the steering plate of the present invention.

DESCRIPTION OF THE PREFERRED EMBODIMENT

The hydraulic stub cutter 10 of the present invention, shown in FIG. 1, defines a longitudinal structure adapted to be conveyed through the interior of sewage pipes undergoing repair. Specifically, stub cutter 10 includes front and rear skids 12 and 14, respectively, on which the overall mechanism rests while positioned within the sewer pipe. A pair of pull rings or shackles 16, affixed through holes in the front skid, facilitate attachment of tethers which, in turn, are utilized to drag the stub cutter forwardly within the pipe. A similar pair of shackles 18 connected to the rear of the cutter housing 20 (FIG. 2) permits rearward movement of the stub cutter.

As best shown in FIGS. 2 and 3, the housing 20 is cylindrical in form and defines three separate, but integral sections. Two sections, sections 22 and 24, relate to respective forward and aft expandable sleeve elements 26 and 28 (FIG. 1), more specifically, these sections define the regions on the housing where the corresponding sleeve elements are mounted. The third or center section functions, first, to space apart the sleeve elements 26,28 and, second, through the opening 32 therein, to facilitate access to the hydraulic motor 34, hydraulic ram 36, and other components located within the housing. A pair of center skids 38 are provided on the center housing section.

Two pairs of rings 40,42 and 44,46 axially delimit, respectively, each sleeve element section of the housing and serve to maintain the sleeves in their proper positions whether inflated or deflated. The outer rings 40,46 are bolted to the housing and, therefore, may be removed as required for service of the sleeve elements while the inner rings 42,44 may advantageously be welded to the housing 20 as there will be no occasion for their subsequent removal. Skids 12 and 14 are preferably bolted to the front and rear of housing 20 although, alternatively, the skids may be rigidly attached to the appropriate sleeve rings which, as described, are then bolted to the housing. In this manner the ring and skid form an integral unit facilitating removal for sleeve servicing.

Referring to FIG. 4, a channel track 50 of generally U-shaped cross-section is provided to retain the hydraulic ram 36 and hydraulic motor 34 for sliding motion of the motor thereon. The channel track 50 is mounted within the housing 20 on front and rear channel supports 52 and 54, respectively, which supports are, in turn, welded to the interior of the housing as shown in FIGS. 2 and 3. More specifically, the front channel support 52 (FIG. 5) is provided with a plurality of equally spaced, forward facing slots 56 (typically four slots) which slots are adapted to engagingly receive post 58 (FIG. 4) rigidly affixed and extending downwardly from the front of channel 50. In similar manner, the rear support 54 is provided with nut 61 adapted to receive bolt 60 extending through the rear of the channel. Multiple posts and bolts may be provided as required for strength.

The channel may be retained on the supports in any of several predetermined orientations depending on the placement of the channel post 58 and bolt 60 in the respective support slot 56 and nut 61. During assembly, the front of the channel is moved laterally along the support 52 until post 58 is aligned adjacent the selected slot 56, whereupon, the channel is slide rearwardly on the supports until the post is received within the selected slot. In a similar manner, the rear of the channel is moved laterally until the channel bolt 60 is in proper position to engage the selected channel nut 61. It will be appreciated that use of multiple slots 56 and nuts on the forward and aft channel supports 52,54 permits the channel 50, with its hydraulic motor and ram thereon, to be mounted within the housing in several differing positions. Such mounting flexibility is required when the apparatus of the present invention is intended for use in larger sewer pipe diameters, generally in excess of 12 inches, in order that the relativey narrow diameter cutting bit 62, typically a six inch diameter, can be oriented in close proximity to the pipe wall. Thus, remounting of the channel within the housing as necessary to accommodate stub pipes intersecting the main sewer line from opposed sides would not be unexpected during a normal sewer repair project.

Referring again to FIG. 4, the hydraulic ram 36 is rigidly mounted at its rear 64 to the channel 50. The shaft or plunger 66 of the ram is connected to the rear of the hydraulic motor 34 which, in turn, slides within the channel upon activation of the ram. The hydraulic motor is coupled to a drive shaft 68 which extends forwardly from the motor along channel 50 and through a bearing 70 affixed to the front end of the channel. Bearing 70 provides a bearing function for both the rotational motion induced by the hydraulic motor as well as the lineal, longitudinal motion of the shaft induced by the hydraulic ram. The cutting bit 62 is mounted on the forward end of the shaft thereby undergoing the same rotational and lineal motion imparted to the drive shaft.

Three hydraulic lines 72,74,76 (FIG. 1) are routed from the rear of the stub cutter and extend through the sewer pipe, back to the above-ground power and control position (not shown). Line 72 operably connects to the hydraulic ram 36 and, when appropriately pressurized, urges the forward movement of the ram plunger 66 as well as the above described interconnected assembly comprising the hydraulic motor 34, drive shaft 68 and cutting bit 62. Lines 74,76 operably connect to the hydraulic motor—the circulation of fluid therethrough causing the rotation of the motor and, importantly, the cutting rotation of bit 62.

An additional line 78 is routed from the rear of the stub cutter to the above ground control position. This is a pneumatic line which is coupled to expansion sleeve elements 26 and 28. Upon pressurization, both sleeves inflate thereby expanding radially outwardly to engage the interior surface of the sewer pipe which, in turn, locks the stub cutter sled against further movement within the pipe.

It is in connection with the inflation of sleeve elements 26,28 that difficulty with the alignment of the cutting bit often arises. More specifically, as the cutting bit 62 will generally or preferably be of a diameter significantly smaller than the diameter of the sewer pipe undergoing repair, sleeve inflation can result in the cutter bit being centered in the pipe or otherwise being positioned at a substantial distance from the wall of the main pipe adjacent the point of stub pipe penetration. In such situations the efficacy of the overall cutting procedure is compromised as a substantial portion of the branch stub pipe remain protruding into the main sewer line following the cutting operation.

This limitation is, in part, alleviated by the above described multiple mounting of the hydraulic motor channel 50 in the housing 20 (on supports 52 and 54) whereby the cutting bit may be laterally offset toward the side of the sewer pipe from which the protruding stub pipe enters. However, many factors including pipe irregularities, sediment and mineral accumulations, and the actual inflation pressure of the sleeve, can compromise the accuracy of bit alignment thereby causing an unpredictable, and often unacceptable, quality of stub cutting. In addition, the lateral bit offset capability of the present apparatus does not aid in moving the bit upwardly as required to sever stub pipes entering the main sewer conduit from above.

As best illustrated in FIGS. 1 and 6, a guide or steering plate 80 bridges the front pair of sleeve retaining rings 40,42. A similar steering plate may optionally be positioned between the rear rings 44,46, although satisfactory results have been obtained with the single forward plate 80. The steering plate forms an arcuate contour defining a segment of a cylinder having a diameter substantially equal to that of the rings 40,42. A pair of post attachment members 82 are rigidly affixed to plate 80 and extend generally perpendicularly from the concave surface of the plate. The attachment members 82 are oriented along a center longitudinal axis of the guide plate and are spaced apart a distance corresponding to the distance between rings 40,42 facilitating attachment of plate 80 to the rings. More specifically, a plurality of holes 84 are formed around the circumference of rings 40,42 which holes are aligned in pairs, that is, for each hole in ring 40 there exists a corresponding hole at the same angular orientation in ring 42. Thus, the steering plate can be mounted to the rings in various angular orientations by placing the plate attachment members 82 into the appropriate pair of holes. The plate can be locked into the selected position by placing a cotter pin 87 or similar locking member through the holes 86 formed in the attachment members 82. Alternatively, the steering plate posts may be omitted and the plate affixed directly to the sleeve rings by self-tapping screws.

The steering plate functions, in the first instance, to block the outward radial travel of the sleeve in the direction of plate 80 during inflation. Thus, referring to FIG. 1, wherein the steering plate 80 is shown positioned directly above the sleeve, the expanding sleeve 46 cannot breach the plate nor, therefore, can it extend upwardly beyond the plate. This facilitates the upward movement of the forward end of the stub cutter until plate 80 contacts the upper surface of the sewer pipe undergoing repair.

A related second function of the steering plate is the forced, opposed travel of the sleeve 26 upon inflation. Blocking the upward expansion of the sleeve results in a concomitant downward expansion thereof. This forced downward sleeve expansion, in essence, aids the normal expansion of the sleeve in that direction thereby generating a significant downward force which acts to urge the cutter upwardly until the steering plate 80 firmly contacts the upper portion of the pipe. The steering plate may be repositioned on rings 40,42 at an angle generally corresponding to the direction at which the stub pipe enters the main sewer conduit.

In the above described manner, the forward end of the stub cutter, with the cutter bit 62 thereon, is accurately and repeatedly positioned in close proximity to the stub pipe regardless of the angle of entry of the stub section. It will be appreciated that the alignment of the cutter bit is largely independent of the sleeve inflation pressure, most pipe irregularities, and the degree of sedimentation or mineral buildup along the bottom of the pipe. It will also be noted that the alignment occurs automatically as the sleeves are inflated and, finally, that in combination with the lateral offset capabilities of the hydraulic channel 50, the present apparatus is suited for use in a wide variety of pipe diameters, in particular, in pipe diameters exceeding the diameter of the cutting bit by over a factor of two.

In operation, the location of offending stub branch pipes are located. This may advantageously be achieved through the use of a video camera (not shown) mounted to the cutter sled. Once located, the steering plate is positioned on the rings at an angle corresponding to that of the branch stub to be cut. If necessary, the channel 50 can be laterally repositioned such that the cutter bit 62 will be closer to the stub pipe upon sleeve inflation. The cutter sled is then dragged through the sewer pipe until the cutter bit 62 is immediately adjacent the stub pipe to be cut. Again, the use of video monitoring techniques may be used where conventional visual observation is impractical.

Once in position, pneumatic pressure is suppled through conduit 78 to simultaneously inflate both sleeve elements 26,28 which, as fully outlined above, serves the redirect the front end of the cutter sled thereby automatically aligning the cutter bit in close proximity to main sewer wall adjacent the pipe to be cut. Pressurization further serves to tightly lock the cutter sled in position during the cutting operation thereby precluding movement as the cutter bit engages the stub pipe. Sleeves 26,28 remain pressurized during the cutting operation.

The cutter bit 62 is next set into high-speed rotational motion by commensing the flow of hydraulic fluid through lines 74,76. It is this high-speed rotation of the cylindrical shell cutter 62 that accounts for the cutting action on the stub pipe. Advancement of the cutter bit into the stub pipe in controlled by applying hydraulic pressure through line 72 to ram 36. Upon application of hydraulic pressure, the cutter bit immediately advances into contact with the stub pipe. The axial or cutting force applied against the pipe by the bit is controlled by the hydraulic pressure. A predetermined cutting force will be set and will remain substantially fixed as the bit advances through the stub pipe.

When the cut has be completed, the cutter bit 62 will be withdrawn by releasing ram hydraulic pressure, hydraulic drive to the motor will be turned-off, and the pneumatic pressure will be relieved from the sleeves thereby releasing the cutter sled. The sled may now be repositioned within the pipe.

What is claimed:

1. A cutter apparatus for remotely severing the ends of branch stub pipes that protrude into the interior of a main pipe, the cutter apparatus being adapted for placement within the main pipe during a severing operation, the cutter apparatus including a housing, the housing defining a longitudinal axis, said axis being aligned substantially parallel to the axis of the main pipe when the cutter apparatus is placed within the main pipe; a pipe cutting bit, the cutting bit adapted to cut upon the rotation thereof about a bit axis; means for mounting the cutting bit in predetermined orientation on the housing wherein the bit axis is substantially parallel to the housing axis; the bit mounting means including bearing means permitting a predetermined first longitudinal movement and a second rotational movement of the cutting bit with respect to the housing; motor means operatively coupled to the cutting bit for rotation the bit; ram means operatively coupled to the cutting bit for applying an axial force to the cutting bit whereby the bit may be moved through the predetermined first longitudinal distance; inflateable sleeve means on the housing for locking the housing in fixed orientation within a main pipe upon inflation thereof, the sleeve means forming a generally annular collar around the housing and adapted for radial outward expansion with respect to the longitudinal axis of the housing; steering means mounted in one of a plurality of fixed positions adjacent the sleeve means for inhibiting expansion of the sleeve means in a first radial direction and for forcing expansion of the sleeve means in a generally opposed second radial direction whereby the housing and cutting bit are urged in the first radial direction into abutting engagement with the interior pipe surface of the main pipe thereby orienting and aligning the cutting in predetermined fixed relationship to said main pipe interior wall.

2. A cutter apparatus for remotely severing the ends of branch stub pipes that protrude into the interior of a main pipe, the cutter apparatus being adapted for placement within the main pipe during a severing operation, the cutter apparatus including a housing, the housing defining a longitudinal axis, said axis being aligned substantially parallel to the axis of the main pipe when the cutter apparatus is placed within the main pipe; a branch pipe cutting bit, the cutting bit adapted to cut upon the rotation thereof about a bit axis; means for mounting the cutting bit on the housing wherein the bit axis is substantially parallel to the housing axis, the mounting means including selectible means for indexing the cutting bit in one of a predetermined plurality of parallel mounting positions whereby the bit may be repositioned on the housing as required according to the angle of penetration of the branch stub pipe into the main pipe; the bit mounting means including bearing means permitting a predetermined first longitudinal movement and a second rotational movement of the cutting bit with respect to the housing; motor means operatively coupled to the cutting bit for rotating the bit; ram means operatively coupled to the cutting bit for applying an axial force to the cutting bit whereby the bit may be moved through the predetermined first longitudinal distance; inflateable sleeve means on the housing for locking the housing in fixed orientation within a main pipe upon inflation thereof, the sleeve means forming a generally annular collar around the housing and adapted for radial outward expansion with respect to the longitudinal axis of the housing; steering means mounted in one of a plurality of fixed positions adjacent the sleeve means for inhibiting expansion of the sleeve means in a first radial direction and for forcing expansion of the sleeve means in a generally opposed second radial direction whereby the housing and cutting bit are urged in the first radial direction into abutting engagement with the interior pipe surface of the main pipe thereby orienting and aligning the cutting bit in predetermined fixed relationship to said main pipe interior wall.

3. The cutter apparatus for remotely severing the ends of branch stub pipes of claim 1, wherein the means for mounting the cutting bit on the housing includes an intermediate member interposed between the cutting bit and the housing; the ram means, motor means, bearing means and cutting bit being retained on said intermediate member; means for rigidly mounting the intermediate member to the housing.

4. The cutter apparatus for remotely severing the ends of branch stub pipes of claim 3 wherein the means for rigidly mounting the intermediate member to the housing includes selectible means for indexing the intermediate member in one of a predetermined plurality of positions on the housing whereby the bit may be repositioned on the housing as required according to the angle of penetration of the branch stub pipe.

5. The cutter apparatus for remotely severing the ends of branch stub pipes of claim 3 wherein the means for rigidly mounting the intermediate member to the housing includes a shelf member rigidly affixed to the housing, the shelf member having a plurality of spaced slots therein; means rigidly affixed to, and extending from, the intermediate member for engaging less than the total number of spaced slots whereby the intermediate member with the cutting bit mounted thereon may be repositioned with respect to the housing by positioning the intermediate member such that selected of the spaced slots are engaged.

6. A cutter apparatus for remotely severing the ends of branch stub pipes that protrude into the interior of a main pipe, the cutter apparatus being adapted for placement within the main pipe during a severing operation, the cutter apparatus including a housing, the housing defining a longitudinal axis, said axis being aligned substantially parallel to the axis of the main pipe when the cutter apparatus is placed within the main pipe; a branch pipe cutting bit, the cutting bit adapted to cut upon the rotation thereof about a bit axis; means for mounting the cutting bit in predetermined orientation on the housing wherein the bit axis is substantially parallel to the housing axis; the bit mounting means including bearing means permitting a predetermined first longitudinal movement and a second rotational movement of the cutting bit with respect to the housing; motor means operatively coupled to the cutting bit for rotating the bit; ram means operatively coupled to the cutting bit for applying an axial force to the cutting bit whereby the bit may be moved through the predetermined first longitudinal distance; inflateable sleeve means on the housing for locking the housing in fixed orientation within a main pipe upon inflation thereof, the sleeve means forming a generally annular collar around the housing and adapted for radial outward expansion with respect to the longitudinal axis of the housing; first and second annular ring means on the housing adjacent the forward and aft ends of the sleeve means for retaining the sleeve means in fixed position on the housing; a steering plate for inhibiting expansion of the sleeve means in a first radial direction and for forcing expansion of the sleeve means in a generally opposed second radial direction; means for mounting the steering means in one of a plurality of fixed positions adjacent the sleeve means whereby the housing and cutting bit are urged in the first radial direction into abutting engagement with the interior pipe surface of the main pipe thereby orienting and aligning the cutting bit in predetermined fixed relationship to said main pipe interior wall.

7. The cutter apparatus for remotely severing the ends of branch stub pipes of claim 6 wherein the means for mounting the steering means includes a plurality of spaced holes in the first and second ring means, said spaced holes defining a plurality of circumferentially spaced steering plate mounting positions; post means on the steering plate for inserting in holes in the ring means whereby the angular position of the steering plate can be changed by withdrawing the steering plate and post means from ring means holes defining a first circmferential position and inserting the steering plate and post means into ring means holes defining a second circumferential position.

* * * * *